United States Patent [19]
Nower et al.

[11] Patent Number: 5,621,655
[45] Date of Patent: Apr. 15, 1997

[54] CENTRALIZED ALIGNMENT MANAGEMENT SYSTEM

[75] Inventors: Daniel L. Nower, Knoxville; Willie T. King, Powell; Kenneth R. Piety, Knoxville, all of Tenn.

[73] Assignee: Computational Systems, Inc., Knoxville, Tenn.

[21] Appl. No.: 382,270

[22] Filed: Feb. 1, 1995

Related U.S. Application Data

[63] Continuation of Ser. No. 72,397, Jun. 3, 1993, abandoned.

[51] Int. Cl.$^6$ .............................. G06F 17/40; G06F 19/00
[52] U.S. Cl. ...................................... 364/506; 364/474.34
[58] Field of Search ..................................... 364/507, 508, 364/506, 551.01, 580, 474.34, 474.35, 474.37; 73/460, 462, 459; 356/400, 153; 250/231.16, 231.18, 561; 33/228

[56] References Cited

U.S. PATENT DOCUMENTS

| | | |
|---|---|---|
| 3,525,158 | 8/1970 | Torlay . |
| 4,148,013 | 4/1979 | Finn et al. . |
| 4,367,594 | 1/1983 | Murray, Jr. . |
| 4,428,126 | 1/1984 | Banks . |
| 4,463,438 | 7/1984 | Zatezalo et al. . |
| 4,520,674 | 6/1985 | Canada et al. ...................... 364/508 X |
| 4,586,264 | 5/1986 | Zatezalo . |
| 5,026,998 | 6/1991 | Hölzl . |
| 5,056,237 | 10/1991 | Saunders . |
| 5,115,406 | 5/1992 | Zatezalo et al. . |
| 5,185,937 | 2/1993 | Piety et al. . |

OTHER PUBLICATIONS

*Shaft Alignment Handbook*, J. Piotrowski, Copyright 1986. pp. 101–103.

*Alignment Manual for Horizontal, Flexibly Coupled Rotating Machines*, 3rd Edition, M. Murray, Jr., Copyright 1983, p. 31.

*Total Alignment*, V.R. Dodd, Copyright 1974, pp. 1–5, II–6, II–7.

"Coupling Alignment: The Reverse Indicator Method Simplified", Boalm, *P/PM Technology*, Jul./Aug. 1990, pp. 16–23.

"Aligning Shafts—Part 1, Measuring Misalignment", Durklin, *Plant Engineering*, Feb. 8, 1979, pp. 102–105.

"Aligning Shafts—Part 2, Correcting Misalignment", Durkin, *Plant Engineering*, Feb. 8, 1979, pp. 102–105.

*Primary Examiner*—Emanuel T. Voeltz
*Assistant Examiner*—M. Kemper
*Attorney, Agent, or Firm*—Luedeka, Neely & Graham, P.C.

[57] ABSTRACT

A system for managing the alignment of a plurality of machine sets includes a portable alignment analyzer for calculating machine moves tending to bring the shafts of a machine set into alignment, and a base computer. A database of alignment documentation for the machine set is maintained in the base computer, the database including alignment fixture setup data, machine dimensions and tolerances, by way of example. A data link at least periodically enables communication between the base computer and the portable alignment analyzer. When the data link is active, alignment documentation for the machine set may be selectively Loaded into the portable alignment analyzer, and measured misalignment data may be selectively Dumped to the base computer for storage in the database. The system allows previously entered and stored machine-specific setup information to be used for a current alignment job, requiring only minor changes in the field.

34 Claims, 12 Drawing Sheets

CENTRALIZED ALIGNMENT MANAGEMENT SYSTEM

This is a continuation of application Ser. No. 08/072,397, filed Jun. 3, 1993, now abandoned.

BACKGROUND OF THE INVENTION

The present invention relates generally to the art of aligning, employing a suitable alignment fixture, machine sets including first and second rotatable machine shafts which are coupled together for operation by means of a shaft coupling. More particularly, the invention relates to a comprehensive system for managing the alignment of at least one machine set and, typically, a plurality of machine sets. Although disclosed herein in the context of aligning co-rotatable in-line machine shafts, the invention is applicable to a wide variety of other configurations of both co-rotatable and independently rotatable shafts, including without limitation parallel shafts, shafts coupled by right angle gear boxes, vertical machines, and machine trains of three or more components.

The invention herein is related to the invention of Daniel L. Nower, Willie T. King and Kenneth R. Piety, application Ser. No. 08/072,316, filed Jun. 3, 1993, concurrently herewith, entitled "ALIGNMENT ANALYZER WITH GRAPHICAL TOLERANCE DISPLAY", now U.S. Pat. No. 5,526,282, the entire disclosure of which is hereby expressly incorporated by reference.

As is well known, whenever two rotating machine shafts are coupled together, such as the shaft of an electric motor and the shaft of a pump, it is important that the shafts be aligned within predetermined tolerances. Such shafts, when in perfect alignment, have their extended center lines (axes of rotation) coinciding along a straight line. Misalignment can lead to vibration, excessive wear, and ultimate destruction of couplings, bearings, seals, gears and other components.

There are two relevant misalignment components, and either or both may be present in a given situation. One misalignment component is offset misalignment, also termed parallel misalignment or simply offset. In the case of offset misalignment, shaft center lines may be parallel, but they do not intersect. The other misalignment component is angular misalignment, and occurs when shaft centerlines or their extended centerlines intersect at an angle. Angular misalignment is also termed angularity, and is manifested as a difference in distance between coupling hub faces across a diameter of the coupling hub faces.

A number of machine set alignment methods are known, which generally have in common the use of suitable alignment fixtures, also termed alignment brackets. The alignment fixtures are employed to measure particular relative displacements (also termed offsets) as the shafts are rotated together through one revolution, while stopping for example at 0°, 90°, 180° and 270° rotational positions to take offset readings. Each relative displacement is measured between a point referenced to one of the shafts by means of the alignment fixture and a point on the other shaft. Dial indicators are often employed, these dial indicators having a plunger which either moves a hand on the face of an analog dial indicator, or causes an indication on the display of a digital indicator.

The readings are then used to calculate machine moves which will tend to bring the shafts into alignment. The 0°, 90°, 180° and 270° rotational positions at which readings are conventionally taken lie in geometric planes in which either of the machines, for example the motor, may be moved for purposes of alignment. In particular, the mounting bolts of the machine are loosened and either the machine is moved in a horizontal plane; or the machine is moved in a vertical plane by placing or removing shims under one or more of the feet of the machine; or both. There are well developed calculation methods and procedures known in the art for determining what machine moves to make to achieve an aligned condition based on measurement of relative displacement (offset) data at a plurality of shaft angular positions.

Various machine set alignment approaches are described in greater detail in Piety et al application Ser. No. 07/892,587, filed Jun. 3, 1992, now U.S. Pat. No. 5,263,261 entitled "SHAFT ALIGNMENT DATA ACQUISITION" the entire disclosure of which is hereby expressly incorporated by reference. Alignment approaches include the reverse indicator method wherein a suitable alignment fixture or bracket is employed to measure a pair of relative displacements (offsets) in a radial direction at a plurality of shaft angular positions, and the face-and-rim method. The "rim" part of the face-and-rim method is measurement of a relative displacement (offset) in a radial direction (the same as one of the offsets measured in the practice of the reverse indicator method), and the "face" part of the face-and-rim method is measurement of a relative displacement in an axial direction. Traditionally offset measurements are made at the 0°, 90°, 180° and 270° shaft angular positions, as this facilitates calculation of machine moves required to bring the machine sets and thus the shafts into alignment. However, and as is disclosed in the above-incorporated application Ser. No. 07/892,587, now U.S. Pat. No. 5,263,261, offset data may be collected at a plurality of arbitrary measurement positions, with a minimum of three measurement positions.

It is also well known that alignment fixtures are subject to a phenomenon known as "sag" which is essentially a deflection of a portion of the alignment fixture under the force of gravity. For accurate alignment results, the amount of "sag", for a particular alignment fixture must be determined and taken into account. A further description of "sag" techniques for determining "sag" and a method for verifying the mechanical integrity of an alignment fixture are disclosed in Piety et al U.S. Pat. No. 5,185,937, entitled "ALIGNMENT BRACKET ASSEMBLY INTEGRITY CHECK AND SAG DETERMINATION" the entire disclosure of which is also hereby expressly incorporated by reference.

As disclosed in the above-incorporated Piety et al application Ser. No. 07/892,587, now U.S. Pat. No. 5,263,261 the calculation of machine moves tending to bring the shafts of a machine set into alignment may be performed in a portable alignment analyzer, in the nature of a hand-held calculator, which calculates machine moves for bringing the shafts of a machine set into alignment based on measured offset data at a plurality of shaft angular positions. The measured offset data may be either entered manually via a keypad on the portable analyzer, or offset data may be directly acquired from transducers included as part of an alignment fixture. Related devices are disclosed in Zatezalo et al U.S. Pat. No. 4,463,438, entitled "SHAFT ALIGNMENT CALCULATOR" and in Zatezalo et al U.S. Pat. No. 5,115,406, entitled "ROTATING MACHINERY DIAGNOSTIC SYSTEM".

SUMMARY OF THE INVENTION

It is an object of the invention to provide an improved system for managing the alignment of a plurality of machine sets.

It is another object of the invention to provide a system for managing the alignment of at least one machine set which system is extremely easy to use, and which involves minimal setup and minimal repetitive data entry for use.

Briefly, in accordance with one aspect of the invention, a system for managing the alignment of at least one machine set including first and second rotatable shafts connected respectively to first and second machines employing an alignment fixture for measuring a pair of offsets at a plurality of shaft angular positions includes a portable alignment analyzer for recording measured offset data and for calculating machine moves tending to bring the shafts of a machine set into alignment, and a base computer. The portable alignment analyzer may be configured either for manual entry of offset data determined from measurement devices included as part of the alignment fixture, or it may be configured for direct data acquisition of offset data from transducers included as part of the alignment fixture, or both. Typically, the portable alignment analyzer includes a data processor operating under stored program control.

The system additionally includes a database, maintained in the base computer, of alignment documentation for the machine set, and typically a plurality of machine sets. Typically the database of alignment documentation includes alignment fixture setup data and machine dimensions, and may further include measured offset data from at least one previous alignment job, notes from previous jobs, and alignment tolerances. The base computer includes elements, such as a database manager, operable to enter alignment fixture setup data and machine dimensions into the database, as well as for modifying setup data and alignment tolerances, for subsequent Loading into the portable alignment analyzer.

A data link is provided for at least periodically enabling communications between the base computer and the portable alignment analyzer. The data link may be in the form of a serial communications cable which is selectively connected, or the data link may be in the form of an optical communications link, or a read/write memory card.

The base computer and the portable alignment analyzer are operable, when the data link is active, to selectively Load alignment documentation for the machine set or sets from the base computer database into the portable alignment analyzer, and to selectively Dump at least measured offset data for the machine set or sets from the portable alignment analyzer to the base computer for storage in the database. In one embodiment, the base computer is operable to download program instructions to the portable alignment analyzer via the data link.

The portable alignment analyzer more particularly includes a memory organized to include a Stored Job(s) Area and a Current Job Area. The portable alignment analyzer is operable to permit data to be selectively recalled from the Stored Job(s) Area into the Current Job Area, and to permit data in the Current Job Area to be selectively stored in the Stored Job(s) Area. Thus, when the data link is active, the base computer and the alignment analyzer are operable to selectively Load alignment documentation from the base computer database into the Stored Job(s) Area of the portable alignment analyzer, and to selectively Dump alignment documentation from the Stored Job(s) Area of the portable alignment analyzer to the base computer for storage in the database.

In accordance with another aspect of the invention, the portable alignment analyzer includes a display device capable of displaying a graphical representation, and elements operable to selectively display on the display device diagrammatic representations of alignment setup configurations to aid in user data entry.

The system of the invention, involving a database maintained in a base computer and a portable alignment analyzer, results in a number of significant advantages.

General advantages include the ability to quickly retrieve and review the alignment status of all equipment in an entire plant to help plan maintenance priorities and scheduling. In addition, the alignment history of a particular technician can be quickly retrieved and reviewed in order to determine if more training is needed, and the alignment history of a particular piece of equipment can be quickly retrieved and reviewed to determine if the machine is going out of alignment too frequently, thus providing enhanced trouble shooting. In the past, producing documentation of alignment jobs has been a bothersome task. When the present invention is employed, documentation is almost automatic.

A more particular and a significant advantage is that the system of the invention additionally allows previously entered and stored machine-specific data and setup information to be used for a current alignment job on the same machine, or on a similar machine, thus requiring only minor changes in the field.

In this regard, it may be noted that a certain amount of initial setup is required before offset data can be meaningfully acquired and entered into the portable alignment analyzer. Relatively general setup information related to defining a job includes which of two machines is fixed and which is to be moved during an alignment procedure, the direction in which the shafts and alignment fixture are rotated during an alignment procedure, the amount of thermal growth, and notes relating to the job, such as notation of a "soft foot" condition. Other initial setup includes the particular alignment method to be employed (including fixture configuration), machine dimensions, fixture dimensions and tolerances. In accordance with the invention, the various setup parameters can be set up once and later quickly and efficiently retrieved and Loaded into the alignment analyzer, either for use as-is, or for use after selective modification.

In order to obtain precision alignment, the accuracy of the alignment should be monitored. Relevant questions are how accurate should the alignment be and how accurately are alignments being performed? That is where the tolerances become important. The control of tolerances can be centralized, therefore creating continuity and standardization throughout a plant. Conformance to tolerances is automatically calculated and documented. Research has been performed proving that precision alignment improves the efficiency of the machine. The parameters required to measure the effect on efficiency can be easily measured and stored in the database for the calculation of savings from increased equipment efficiency from precision alignment.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description, taken in conjunction with the drawings, in which:

DETAILED DESCRIPTION

Figure 1:
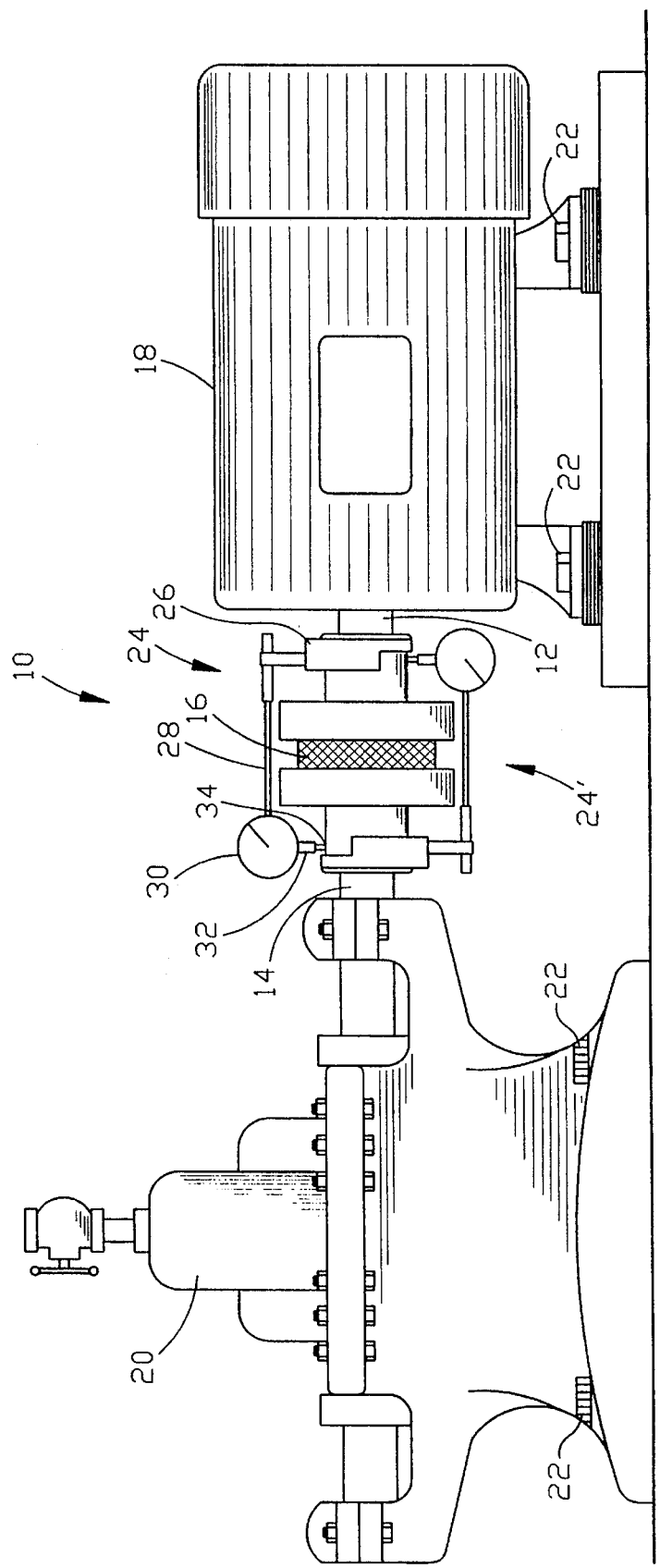
FIG. 1 depicts in overview the general environment of a machine set including first and second co-rotatable in-line shafts connected respectively to first and second machines, with a dial indicator type alignment fixture spanning the coupling for measuring relative displacement (offset) at various shaft angular positions.

Referring initially to FIG. 1, the general environment in which the invention may be employed is a factory or plant typically including a number of rotating machine sets, such as representative machine set 10. The machine set 10 includes first and second co-rotatable in-line shafts 12 and 14 connected to each other by means of a coupling 16. The shafts 12 and 14 are connected respectively to first and second rotating machines 18 and 20, in the representative form of a motor 18 driving a pump 20. It will be appreciated that the shafts 12 and 14 actually comprise elements of the respective machines 18 and 20.

The machines 18 and 20 are secured to a floor or other underlying support by means of bolts 22. As is well known, for alignment purposes, the bolts 22 can be loosened, and either or both of the machines, typically the motor 18, can be moved in horizontal and vertical planes in order to achieve alignment between the shafts 12 and 14 of the machine set 10 within predetermined tolerances. As are shown under the feet of the motor 18, shims are usually employed to selectively raise and lower mounting points for the machines 18 and 20 during an alignment procedure.

Also shown in FIG. 1 are a pair of typical alignment fixtures 24 and 24'. The fixture 24 has a base 26 fixed to the first shaft 12, an extension bar 28 extending generally parallel to the shafts 12 and 14 over the coupling 16, and a dial indicator 30 having a plunger 32 contacting the periphery of a portion of the second shaft 14 at a point 34, which portion happens to be a hub of the coupling 16. It will be appreciated that the base 26 and extension bar 28 together serve to define a reference point over the point 34 on the second shaft 14, which reference point is referenced to the first shaft 12. As the shafts 12 and 14 are rotated together, relative displacement in a radial direction (radial offset) between the reference point and the point 34 on the shaft 16 is measured at various angular positions, to thus collect a set of offset data. This offset data directly reflects distance and direction of the distance between the extended centerlines of the two shafts 12 and 14 in the transverse plane containing the measurement point.

In accordance with the reverse indicator alignment method, in order to have sufficient data for determining alignment moves, a second set of offset data must be collected in another transverse plane, in addition to the transverse plane containing the point 34. Although such data could be taken by extending the extension bar 28, conventionally the second set of data is taken by an alignment fixture extending in the opposite direction, that is, fixed to the second shaft 14 and extending laterally to a reference point over a point on the first shaft 12. A single alignment fixture 24 may be employed, and moved from one side to the other, or a pair of alignment fixtures 24 and 24' may be employed for simultaneous readings, as represented in FIG. 1. Preferably, however, a combination alignment fixture is employed for simultaneous readings, such as is described hereinbelow with reference to FIG. 4. When a pair of alignment fixtures 24 and 24' are employed, they typically are positioned on opposite sides of the shafts, that is, 180° apart for "out of phase" readings. However, they may also be positioned immediately adjacent each other for "in phase" readings. The preferred combination alignment fixture of FIG. 4 serves to acquire "in phase" readings.

Although the alignment fixturing in FIG. 1 is for the reverse indicator method, the system of the invention is not limited to implementations of this particular method. Various forms of the face-and-rim method may be employed wherein one offset is a radial offset, and the other is an axial offset. Analysis procedures for a number of specific methods are well developed.

It should be noted that another relevant factor is known as "sag", which is a result in part of beam deflection of the extension bar 28 under force of gravity. To achieve an accurate alignment, sag is a factor which must be independently measured and taken into account in making calculations, as is well known in the art. One method of determining sag is disclosed in the above-incorporated Piety et al U.S. Pat. No. 5,185,937, entitled "ALIGNMENT BRACKET ASSEMBLY INTEGRITY CHECK AND SAG DETERMINATION".

Figure 2:
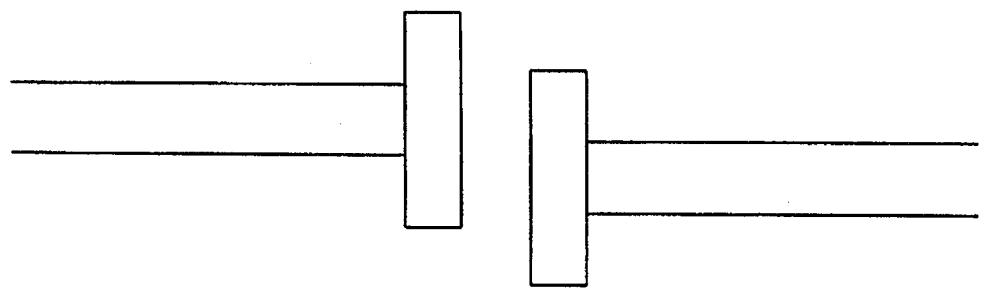
FIG. 2 depicts offset misalignment.
Figure 3:
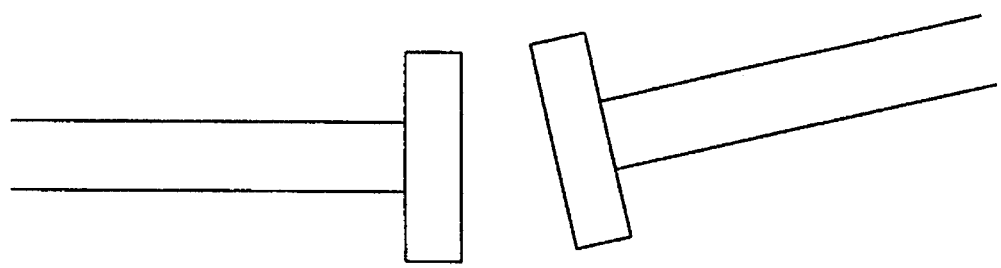
FIG. 3 depicts angular misalignment.

FIG. 2 illustrates the misalignment component alternatively known as offset misalignment, offset, or parallel misalignment. FIG. 3 illustrates the misalignment component alternatively known as angular misalignment or angularity. Preferably offset and angularity are determined with reference to the center of the coupling, as this makes feasible the specification of predetermined tolerances. Either or both of these misalignments may be present in a given situation, and they may exist in any plane. In most situations, the misalignment can be corrected by proper moves of one of the machines in vertical and horizontal planes, including the use of shims to raise and lower individual mounting feet of a particular machine.

Figure 4:
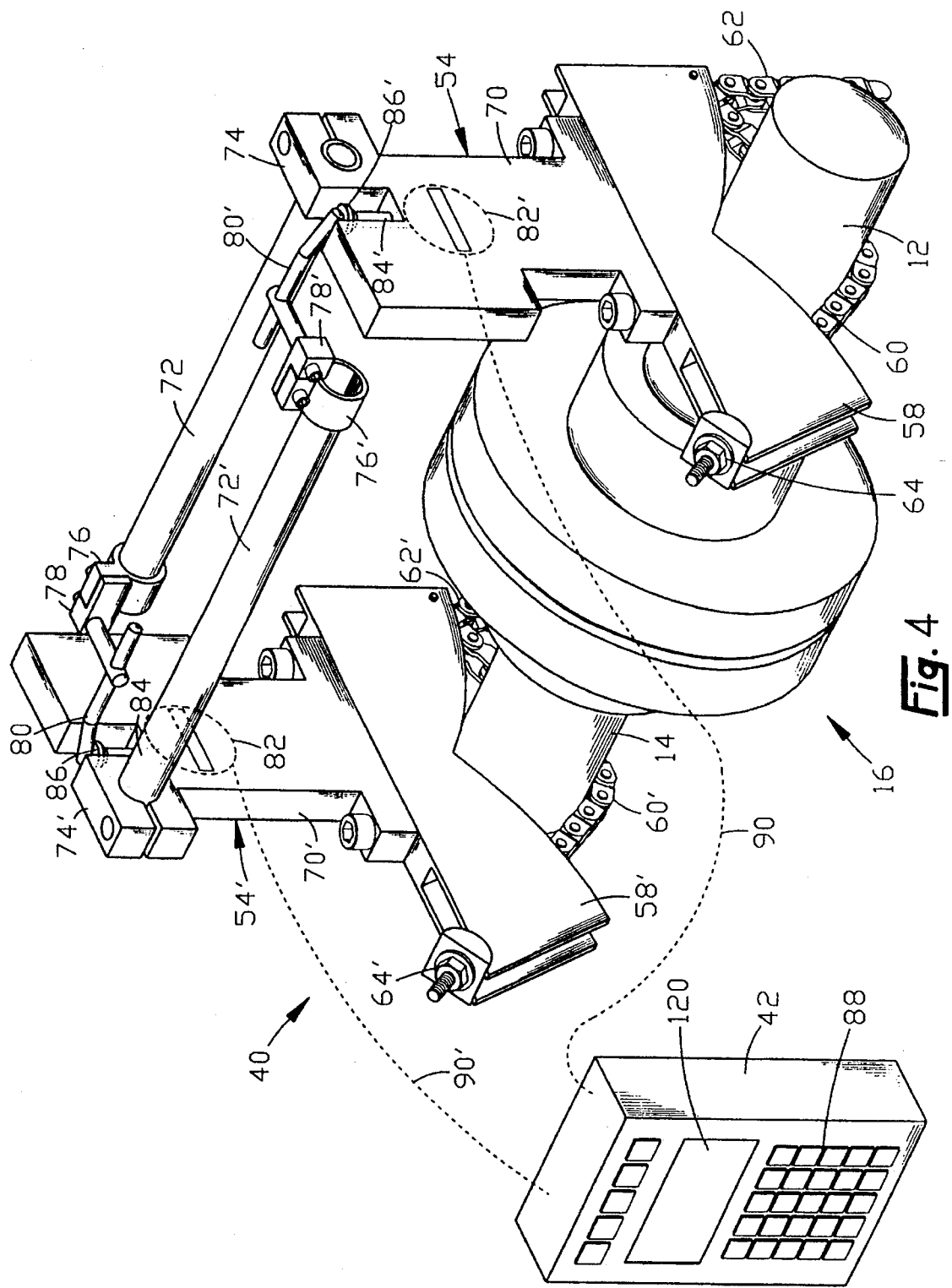
FIG. 4 is an enlarged three-dimensional view of a preferred form of alignment fixture in place over the coupling portion of the machine set of FIG. 1, with a portable alignment analyzer in use.

FIG. 4 depicts a preferred form of a combination alignment fixture 40 for measuring a pair of offsets at a plurality of shaft angular positions, and a portable alignment analyzer 42 for recording measured offset data and for calculating machine moves tending to bring the shafts 12 and 14 of the machine set 10 into alignment. The alignment fixture 40 has first and second fixture elements 54 and 54' respectively mountable to the first and second shafts 12 and 14. In particular, the first fixture element 54 comprises a suitably configured mounting block 58 secured to the shaft 12 by means of a chain 60 and swing link 62 adjustably connected to one end of the chain, and a tightening device 64 connected to the other end of the chain 60. The second fixture element 54' correspondingly comprises a suitably configured mounting block 58' a chain 60' a swing link 62' and a chain tightening device 64'.

Attached to the mounting blocks 58 and 58' are respective sensor heads 70 and 70'. Although not depicted in FIG. 4, spacer blocks may be employed between the sensor heads 70 and 70' and the mounting blocks 58 and 58' in order to provide clearance around a large coupling 16. Such spacer blocks (not shown) may be provided as a set of different height spacer blocks for selective use to adopt the fixture 40 to various coupling situations.

The particular fixture 40 depicted in FIG. 4 facilitates measurement of a pair of radial offsets at each of a plurality of measurement angular positions as the shafts 12 and 14 are rotated together. Thus, a first extension bar 72 is firmly affixed to the first sensor head 70 by means of an extension bar clamp 74, and the first extension bar 72 extends over the coupling 16, generally parallel to the shafts 12 and 14, to a point over the second shaft 14. Secured to the distal end 76 of the extension bar 72 by an adjustable attachment element 78 is an adjustable tip element 80, the end of which is fixedly referenced, neglecting sag, to the first shaft 12. The tip element 80 thus defines a reference point referenced to the first shaft 12, and is positioned over a particular point on the second shaft 14. The extension bar clamp 74 and the attachment 78 for the tip element 80 are adjustable to adapt the fixture 40 to various coupling situations.

Correspondingly, firmly affixed to the second sensor head 70' is a second extension bar 72'. The second sensor head 70' and second extension bar 72' are essentially identical to the first sensor head 70 and first extension bar 72, but in the opposite orientation. Elements associated with the second extension bar 72' and corresponding with like elements of the first extension bar 72 as described hereinabove include a second extension bar clamp 74' a distal end 76' an adjustable attachment element 78' and an adjustable tip element 80' which defines a reference point referenced to the second shaft 14 and positioned over a particular point on the first shaft 12.

Included within the sensor heads 70 and 70' are respective digital indicators 82' and 82 having respective plunger-like connecting rods 84' and 84 terminating in respective tips 86' and 86 which engage the tip elements 80' and 80 attached to the extension bar 72' or 72 affixed to the opposite sensor head 70' or 70. The connecting rods 84 and 84' are lightly spring loaded such that the extension bar tip elements 80 and 80' and the respective tips 86 and 86' are in contact at all times during a measurement operation, and the tips 86,86' and connecting rods 84,84' translate as the distance between the extension bar tip elements 80 and 80' and the shafts 14 and 12 varies in a radial direction during shaft rotation.

The digital indicators 82 and 82' are preferably digital electronic indicators having digital readout displays with a resolution of 0.5 mil, such as model no. 543-611. These particular digital indicators 82 and 82' additionally can serve as electronic transducers, and include cable connections. Thus, offset data is either manually entered into the portable alignment analyzer 42 via a keypad 88, directly acquired via optional cables 90 and 90' shown in dash lines, connected between the transducer-type digital indicators 82 and 82' and the portable alignment analyzer 42.

As an alternative to the alignment fixture 40 employing extension bars 72,72' and digital indicators 82,82' with connecting rods 84,84' a laser-based alignment fixture (not shown) may be provided, employing a laser and a light-sensitive target.

Figure 5:
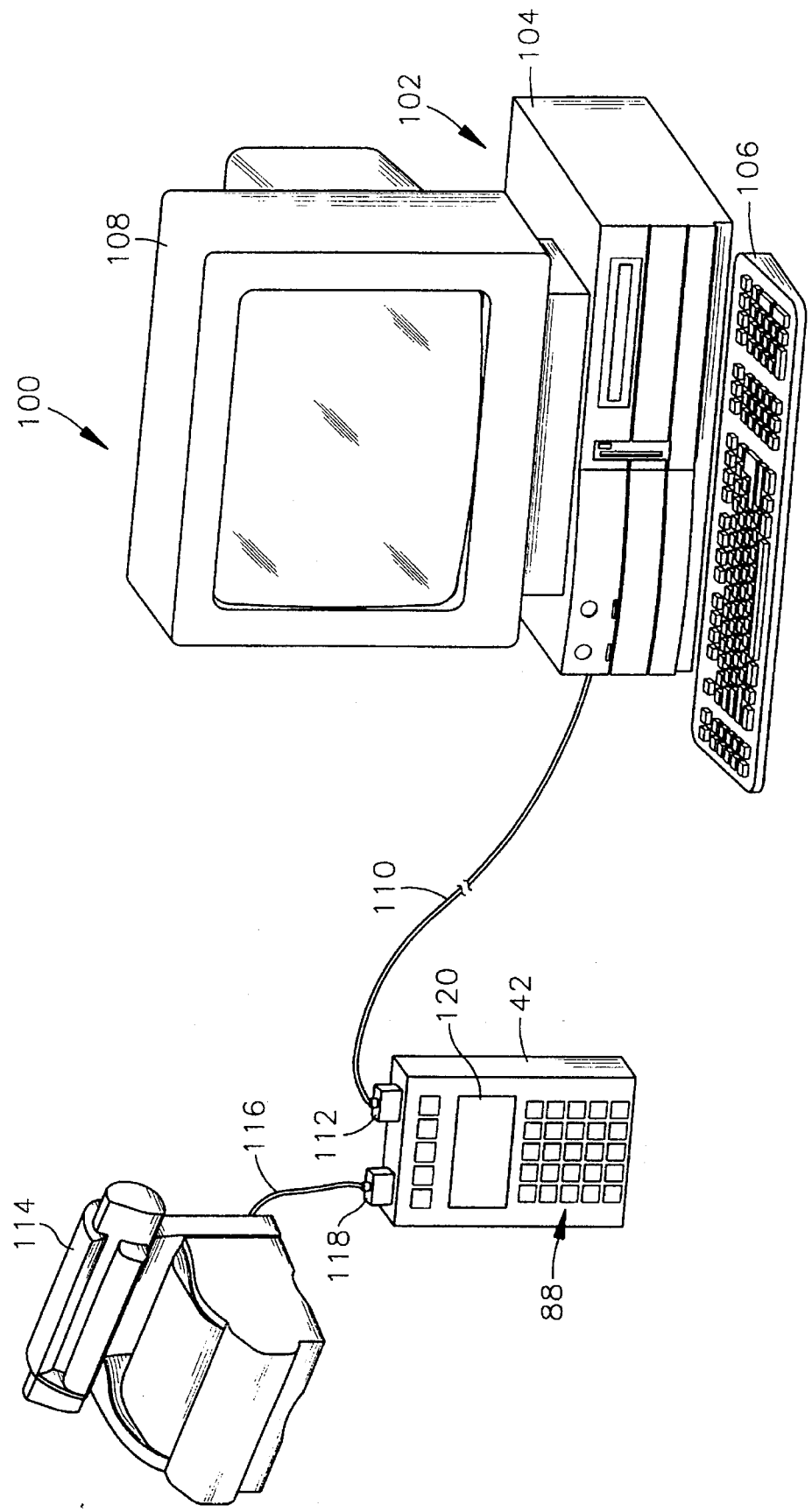
FIG. 5 is a depiction, not to scale, of the portable alignment analyzer of FIG. 4 connected via a data link to a base computer.

With reference now to FIG. 5, a system 100 in accordance with the invention includes the portable alignment analyzer 42, and a base computer 102, which may comprise a conventional PC comprising a CPU unit 104, a keyboard 106 and a display monitor 108. FIG. 5 is not drawn to scale, in that the size of the portable alignment analyzer 42 with reference to the base computer 102 is greatly exaggerated for clarity of illustration.

A data link, in the representative form of an RS-232 communications cable 110, when connected, enables communications between the base computer 102 and the portable alignment analyzer 42. The cable includes at one end a suitable connector 112 for connection to the portable alignment analyzer 42, and the other cable 110 end (not visible) connects to a conventional COM port on the CPU unit 104. Other forms of data link may be employed. For example, instead of the direct connecting by cable 110, modems may be used for data transfer over a telephone line. Another alternative is an optical data link.

For direct printing of reports by the portable alignment analyzer 42, independently of the base computer 102, a conventional printer 114 may be connected to the portable alignment analyzer 42 via a standard parallel printer cable 116 terminating in a suitable connector 118.

The portable alignment analyzer 42, in addition to the user keypad 88, includes a display device 120 capable of displaying a graphical representation. Preferably, the display device 120 is a liquid crystal display, such as an Epson model no. EG4401Y-ER.

Figure 6:
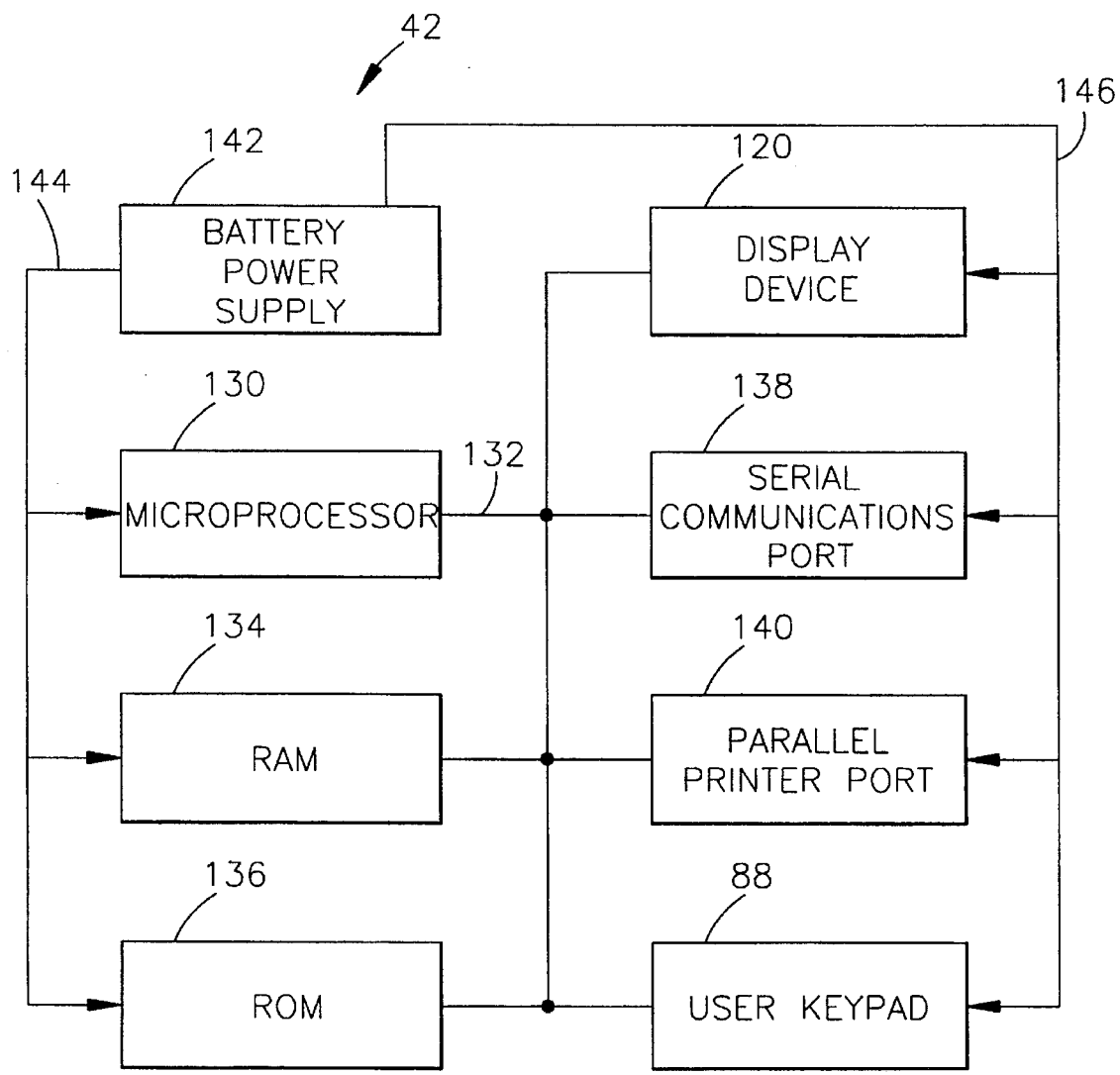
FIG. 6 is a highly schematic block diagram of the portable alignment analyzer, which comprises a microprocessor-based system.

FIG. 6 is a diagram of the internal arrangement of the portable alignment analyzer 42, which may be seen to comprise a conventional microprocessor-based system including a microprocessor 130, such as an Intel 8080 microprocessor or a Zilog Z80 microprocessor, connected to a conventional microprocessor bus 132. Other devices are connected to the bus 132, and are suitably addressed by the microprocessor 130, as is conventional in such systems. These devices include a random access memory (RAM) 134 in which data are stored and, in some cases, program instructions for the microprocessor 130; and a read only memory (ROM) 136 which includes program instructions for the microprocessor 130 or, at the very least, minimal start-up instructions.

Other devices connected to the microprocessor bus 132 include the user keypad 88, a serial communications port 138 for connection to the data link cable 110, and a parallel printer port 140, for connection to the printer cable 116. Finally, a battery power supply 142 supplies power to the remaining elements through representative supply conductors 144 and 146.

In some cases, a substantial part of the program instructions for the microprocessor 130 may reside in the RAM 134, and these instructions can from time to time be downloaded from the base computer 102 to the portable alignment analyzer 42 via the data link 110. This allows programming improvements to efficiently be effected, without requiring the replacement of internal components such as the ROM 136.

Figure 7:
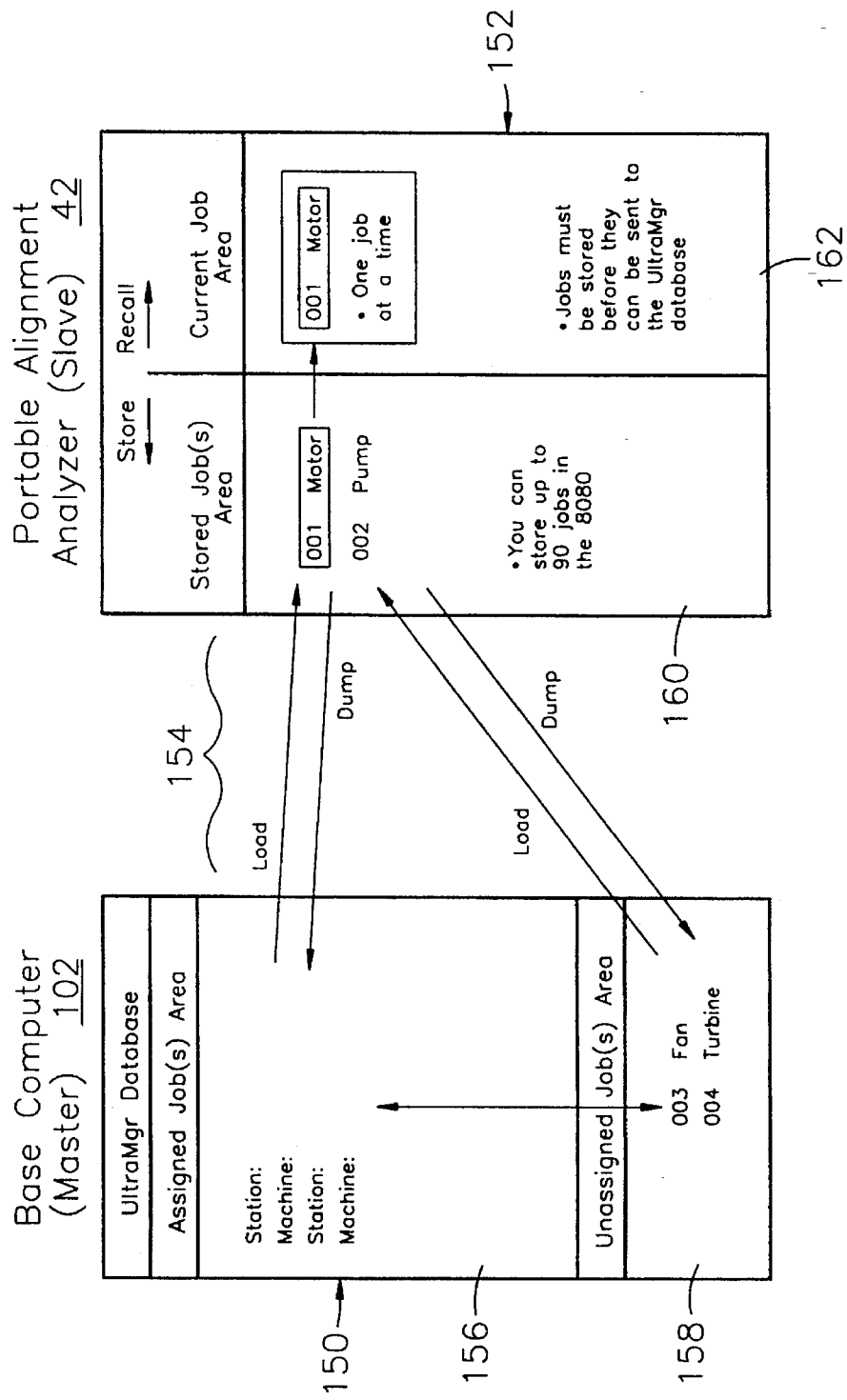
FIG. 7 is a memory map showing various data areas within the FIG. 5 alignment analyzer and within the FIG. 5 base computer, and data transfers between the various areas.

FIG. 7 is a diagrammatic representation of the organization of a database data structure 150 stored in memory within the base computer 102, the organization of a data structure 152 stored in memory within the portable alignment analyzer 42, and arrows representing the manner in which data for various jobs is moved around the system. This includes the movement of jobs via the data link represented physically by the cable 110 in FIG. 5 and by arrows in an area 154 in the FIG. 7 diagram. Running in the base computer 102 is a database manager program, which maintains the database 150 in a conventional manner, and provides for communication as indicated.

In the context of the present invention, the term "job" is employed to represent the data accumulated during an individual alignment session, including various items of setup information which may very well remain unchanged from one "job" to the next.

Within the base computer 102, the data structure 150 in memory is subdivided as an Assigned Job(s) Area 156 and an Unassigned Job(s) Area 158. The data structure 152 within the portable alignment analyzer 42 is organized as a Stored Job(s) Area 160 and a Current Job Area 162.

Overview of Operation

The following three cases provide an overview of the manner in which jobs are moved around between the Stored Job(s) Area 160 and the Current Job Area 162 in the portable alignment analyzer 42, and back and forth to the Assigned Job(s) Area 156 and the Unassigned Job(s) Area 158 within the database maintained within the base computer 102. The operation is described in greater detail hereinafter.

When beginning a job (in the Current Job Area 162), the user normally has two choices: either create, configure, and name an entirely new job; or (if available) recall a job from the Stored Job(s) Area 160.

Case 1: If the user creates and configures an entirely new job in the Current Job Area 162 of the analyzer 42 and wants to keep it, the job is copied into the Stored Job Area 160 by using a Store Job command in a Utility menu. From there (using the database manager), the user Dumps the newly-created job into the Unassigned Job(s) Area 158 of the base computer database 156.

Working with the database manager, the user then assigns the job to a machine and station, thereby fully integrating the job information into the database. If for some reason the user does not want to assign the job to a machine and station, the job can be left in the Unassigned Job(s) Area 158.

In either event, the database manager can be used to Load the job back into the portable alignment analyzer 42 and, from that point, recall it into the Current Job Area 162 for further editing.

Case 2: The user begins with a job recalled from the Stored Job(s) Area 160 into the Current Job Area 162. (A job recalled into the Current Job Area 162 is essentially a copy of the original job which remains in the Stored Job(s) Area 160.) This allows the copy to be modified, re-numbered and saved, thereby creating an entirely new job (without affecting the original job).

However, if the user wants to change the original job (instead of creating a new one), the desired changes can be made and, when prompted about saving the original job, the answer is No. This allows data in the original job to be overwritten with new data.

Case 3: Significantly, the database manager can be used to create a job template, which is then Loaded into the Stored Job(s) Area 160 of the analyzer 42. This method has several advantages. (a) In most cases, using the computer 102 keyboard 106 to enter configuration data is faster than entering such data on the keypad 88 of the analyzer 42. (b) Station and machine assignments to the job can be made as templates are created. (c) The entering of configuration data (machine dimensions, etc.) can be finished after the job has been Loaded into the Stored Job(s) Area 160 and recalled into the Current Job Area 162.

In the system of FIG. 7, the base computer 102 is the master and the portable alignment analyzer 42 is a slave. This means that actual transactions between the base computer 102 and the analyzer 42 are controlled by the base computer 102. Although the user enters commands to the portable alignment analyzer 42 to prepare for a job transfer, the analyzer 42 plays a passive role from that point on. The actual transfer is set up and controlled from the database manager running in the base computer 102.

When the database manager is being employed to assign jobs to the database, the user also considers what actions to take after jobs have been created or changed. The user need not take any specific action with the portable alignment analyzer 42 at this point, since the assignment changes occur automatically. Actual assignments are made from database manager menus.

Figure 8:
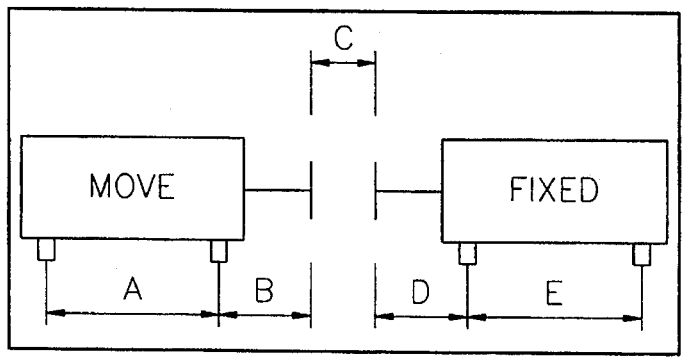
FIG. 8 is a representation of two machines of a machine set, including definitions of several machine dimensions relevant to an alignment job.

FIG. 8 and the following FIELD MODIFICATION TABLE show how changes to the various fields in job records within the database affect job type changes. Although "job type" is a software term, the job type determines whether or not the user needs to make a new assignment in the database manager.

FIELD MODIFICATION TABLE

| Modifications to these fields | change the Job Type to | |
|---|---|---|
| | Unassigned | Modified |
| Coupling | X | |
| Dial Orientation (General method) | | X |
| Machine Dimension: A & E (between feet) | X | |
| Mach Desc | X | |
| Mach ID | X | |
| Machine View (also called machine configuration) | X | |
| Rotation | | X |
| RPM | X | |
| Station | X | |
| Alignment Data | | X |
| Alignment Method | | X |
| Bracket Deflection (CSI method) | | X |
| Bracket Height (CSI method) | | X |
| Machine Dimension: B, C, D, & F | | X |
| Notes | | X |
| Sag | | X |
| Thermal Growth | | X |
| User Initials | | X |

If the user makes a change or changes to a job that causes it to become Modified as shown in the above FIELD MODIFICATION TABLE, the job retains its Station and Machine assignments in the database. However, for database safety, the database manager does not allow the overwriting of the previous job (that was originally Loaded into the Stored Job(s) Area 160 of the analyzer 42, moved to the Current Job Area 162 and modified). A new Job Number and Name can be assigned to the modified job, which should be done in a manner which ensures that jobs are easy to identify.

If the user creates a new job or makes a change or changes to an existing job that causes it to become Unassigned as shown in the above FIELD MODIFICATION TABLE, when Dumped, the job is moved to the Unassigned Job(s) Area 158 of the database. From there, the database manager can be used to assign the job to the Assigned Job(s) Area 156 of the database. Nevertheless, if, for some reason, the user does not want to "assign" a job, it can be left in the Unassigned Job(s) Area 158. The database manager allows such jobs to be Loaded and Dumped to the analyzer 42 the same way assigned jobs are handled.

The operation will now be described in greater detail.

Storing and Recalling a Job

Jobs can reside in two areas in the working area 152 of the portable alignment analyzer 42, the Current Job Area 162, and the Stored Job(s) Area 160. The current job is the active job in the analyzer 42 and can be totally modified to suit a user's needs. There can be only one job at a time in the current job area 162. Before being transferred to the database manager, jobs must be stored in the Stored Job(s) Area 160. The Stored Job(s) Area 160 can have many jobs (up to ninety, for example).

There are two ways to place a job in the Stored Job(s) Area 160:

(1) Define it on the analyzer 42 and use the Store utility function, or (2) Load it by using the database manager running in the base computer 102. As noted hereinabove, many aspects of the job definition can be entered via the database manager running in the base computer, and then Loaded to the portable alignment analyzer 42.

Before a job that is stored can be worked on, it must be recalled from the Stored Job(s) Area 160 to the Current Job Area 162. A series of user menus facilitate this operation.

When recalling a job into the Current Job Area 162 where another job is already located, the user receives a prompt asking if the current job is to be saved. A "No" response allows the current job to be overwritten. When saving the current job, the user must ensure that it does not have the same name as a job already stored (unless the stored job is to be overwritten). To keep both jobs, the name of the job in the Current Job Area 162 must be changed before the job is saved.

Modifying a Job

A recalled job is one that has been copied from the Stored Job(s) Area 160 to become the current job. If the Job Definition and Distances/Sag were previously entered, the first modification causes a text screen to be displayed issuing a warning that the proposed modification will redefine the job, and offering the following three choices:

(1) Ignore Modification. Used if a mistake has been made and the user desires to revert back to the original job entries.

(2) Keep Current Job Modified. Allows the changes to be made.

(3) Save Current Job. Allows the changes to be made and saves the job as a new one.

Particular Alignment Methods

In its preferred form, the portable alignment analyzer 42 offers a choice of two alignment methods:

(1) CSI Reverse Dial, employing the combination fixture 40 of FIG. 4, and (2) General Reverse Dial.

The CSI Reverse Dial method, employing a combination fixture 40 like that of FIG. 4, allows a sag and integrity check to be accomplished in accordance with the disclosure of the above-incorporated U.S. Pat. No 5,185,937. This enables the user to determine bracket sag after setting the fixtures up on the machine being aligned. Using this method saves the time required to do a pre-alignment check. Errors that can occur when fixtures are moved from a pre-alignment check area to the machines being aligned are avoided; also, a fixture setup integrity check is provided. The CSI Reverse Dial method can be used on horizontal spans up to twenty one inches. If spans are greater than twenty one inches, then the General Reverse Dial method must be used.

The General Reverse Dial method is designed for those using the reverse dial indicator method with existing fixtures. Sag must be measured prior to mounting on the machine being aligned.

Defining a Job

A series of user menus is provided allowing the user to define a new job. Although these are described here with reference to the portable alignment analyzer 42, as noted hereinabove, in a similar manner the database manager running in the base computer 102 can be used to create a job template, which is then Loaded into the Stored Job(s) Area of the portable alignment analyzer 42. The first seven of these user means are implemented on a "Define Job" text menu presented on the display device 120, and the remaining ones by graphical "menus" also presented on the display device 120 as described below with reference to specific drawing FIGS.:

(1) Clear Job: The user can erase part or all of the Current job shown on the Define Job menu.

(2) Job #: The user can select up to ten characters to name the job. (A job name must be furnished to save the job; a job cannot be saved with a blank Job #.) The Job # gives the job a unique identification; it can be tied to a work order number, etc. Job # is similar to an MS-DOS filename.

If the job is defined within the portable alignment analyzer 42, the job is subsequently Dumped to the database manager running in the base computer 102 as an Unassigned job. After the Dump is complete, the job should be assigned to its machine. The Job #, Mach ID, Mach Desc, Station, and Coupling are modified to match their assignment within the database manager. If the job is defined within the database manager running in the base computer 102, Mach ID, Mach Desc, Station and Coupling cannot be modified within the portable alignment analyzer 42.

(3) Mach ID: The user can select up to ten characters to label machinery being aligned.

(4) Mach Desc: Up to 28 characters can be used to describe machinery being aligned.

(5) Station: Up to 32 characters can be used to describe the area where the machine is located.

(6) Coupling: If machinery being aligned has more than one coupling, the individual couplings are assigned numbers. An example would be a machinery train consisting of a motor, a gearbox, and a compressor. The coupling between the motor and gearbox should be "1" and the coupling between the gearbox and compressor should be "2". Positive numbers up to ten can be entered.

If a job is received from the database manager and the only changes during the alignment job are the actual alignment readings, the new job is Dumped directly back to the proper station and Machine within the database.

(7) RPM: For each coupling a unique RPM exists and is entered. In the case of a variable speed machine, the highest RPM at which the coupling will be operated is entered. If a coupling design has shafts operating at different speeds, the larger of the two is entered.

Figure 9:
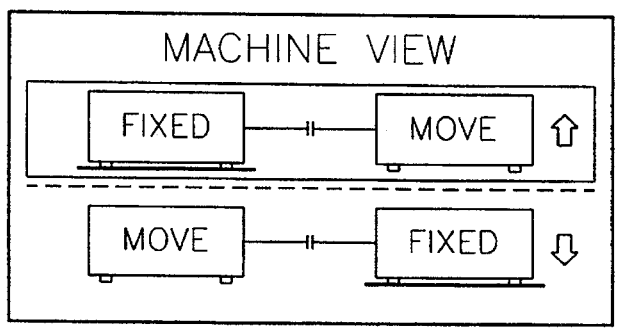
FIG. 9 is a graphical representation which may be presented on the display of the portable alignment analyzer for assisting a user in entering information regarding the name of each machine and which machine is to move during an alignment process.

(8) Set Machine View: "Machine View" relates to fixture setup data and refers to which machine is fixed and which is moved during the alignment process. This menu also allows the user to name the machines such as "motor" and "pump". The user must decide where to be standing to view the equipment being aligned, and the user should be positioned on one side of the coupled machinery only. All offset readings are taken from this side of the coupled machines in order to keep horizontal machine move directions correct. The graphical "menu" of FIG. 9 is presented on the display device 120 of the portable alignment analyzer 42 to aid in entering this information. One machine is fixed indicating that this machine will not be moved during the alignment process but will remain firmly attached to its foundation. The other machine is labeled "move" indicating that it will be moved horizontally and/or vertically to achieve alignment between the two machines. The appropriate view of coupled machines is highlighted by using Up Arrow or Down Arrow keys on the analyzer 42, and then selected.

Figure 10:
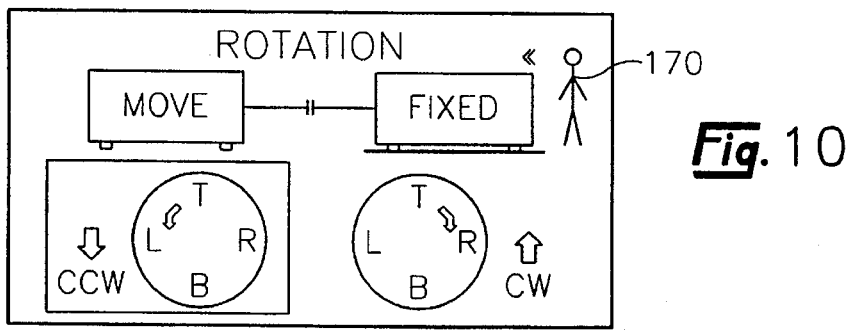
FIG. 10 is a graphical representation which may be presented on the display of the portable alignment analyzer for assisting the user in entering rotation setup information.

(9) Rotation: "Rotation" refers to which direction the shafts 12 and 14 and attached alignment fixture 40 are rotated when measuring alignment. The graphical "menu" of FIG. 10 is presented on the display device 120 to aid in entering this information. Rotation is viewed from a stickman 170, who is standing on the right. The rotation direction helps determine the order in which alignment data will be taken, and it is recommended that the rotation be the same direction as normal operation. Again, the Up Arrow or Down Arrow is used to highlight the desired direction, which is then selected.

Figure 11:
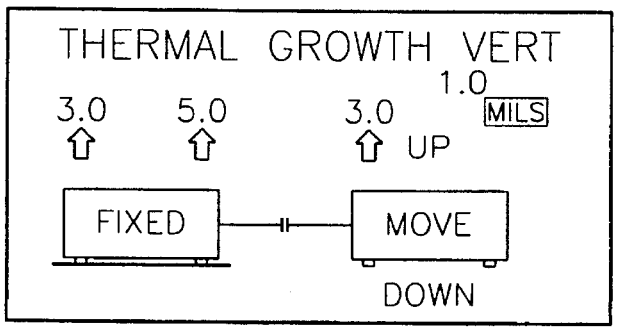
FIG. 11 is a graphical representation which may be presented on the display of the portable alignment analyzer for assisting the user in entering vertical thermal growth setup information.

(10) Thermal Growth, Vertical: "Thermal Growth, Vertical" refers to the amount of vertical thermal growth that the movable and fixed machines experience during operation, and can be expressed in either mils or millimeters. The graphical "menu" of FIG. 11, which shows a side view of the coupled machinery, is presented on the display device 120 to aid in entering this information. Thermal growth values correspond to the amount each shaft will move in the vertical direction directly above each foot. The range of values that can be entered is –250 to 250 (mils) or –6.35 to 6.35 (0.01 mm increments). The Up Arrow or Down Arrow is used to toggle between the growth values. If one or both machines actually experience a downward growth during operation, negative numbers are used.

Figure 12:
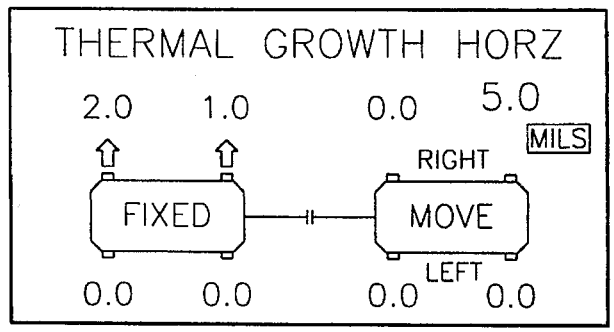
FIG. 12 is a graphical representation which may be presented on the display of the portable alignment analyzer for assisting the user in entering horizontal thermal growth setup information.

(11) Thermal Growth, Horizontal: "Thermal Growth, Horizontal" similarly refers to the amount of horizontal thermal growth that the movable and fixed machines experience during operation. The graphical "menu" of FIG. 12, which shows a top view of the coupled machinery, is presented on the display device 120 to aid in entering the information. Thermal growth values (mils or mm) correspond to the amount each shaft will move at each foot. The range of values that can be entered are –250 to 250 mils and –6.35 to 6.35 mm. The Up Arrow is used to scroll from the right side to the left side on the same bearing, then onto the next bearing to the right. The Down Arrow is used to scroll in the opposite direction.

Determining Bracket Sag

Figure 13:
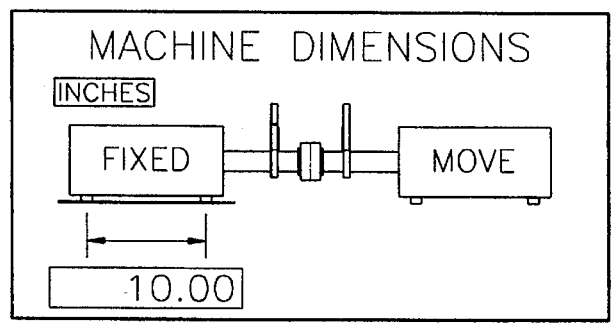
FIGS. 13, 14, 15, 16 and 17 are graphical representations which may be presented on the display of the portable alignment analyzer for assisting the user in entering machine dimension setup information.

There is also a series of graphical "menu" screens presented on the display device 120 to aid in entering information used to determine bracket sag using the CSI Reverse Dial method disclosed in the above-incorporated U.S. Pat. No. 5,185,937. The following graphical menu screens are presented:

(1) Machine Dimension (A): The screen is shown in FIG. 13, and is used to enter the horizontal distance between the inboard and outboard feet (supports) of the fixed machine. The measurement is from the inboard foot center (either inches or millimeters can be entered) to the outboard foot center, to the nearest ⅛ inch.

Figure 14:
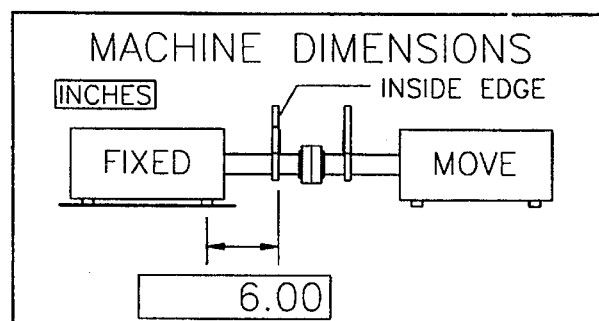

(2) Machine Dimensions (B): This screen is shown in FIG. 14, and is used to enter horizontal distance between inboard feet (supports) of the machine on the left and the fixture element 54' (FIG. 4) secured to the shaft 14 of the machine on the left. The measurement is between the center of the inboard feet and the indicator stem mounted on the left side machine, to the nearest ⅛ inch.

Figure 15:
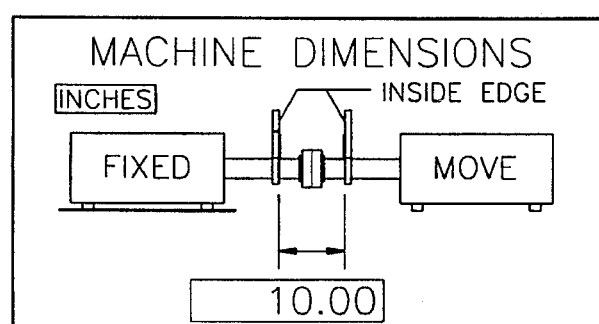

(3) Machine Dimensions (C): This screen is shown in FIG. 15, and is used to enter the distance between the two fixture elements 54 and 54'. The measurement is taken between the stems 84,84' of the digital indicators 82,82' to the nearest 1/16 inch.

Figure 16:
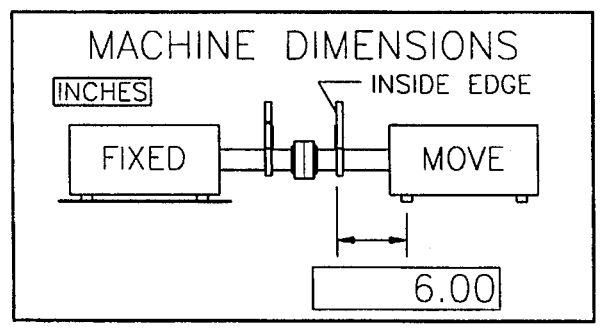

(4) Machine Dimensions (D): This screen is shown in FIG. 16, and is used to enter the horizontal distance between inboard feet (supports) of the machine on the right and the fixture element 54 secured to the shaft 12 of the machine on the right. The measurement is made between the center of the inboard feet and the indicator stem mounted on the right side machine, to the nearest 1/8 inch.

Figure 17:
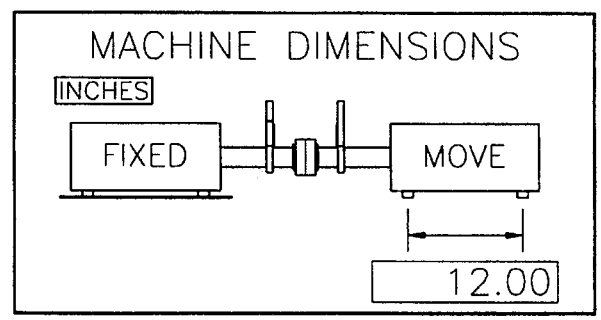

(5) Machine Dimensions (E): This screen is shown in FIG. 17, and is used to enter the horizontal distance between the inboard and outboard feet (supports) of the machine on the right. The measurement is made from the inboard foot center to the outboard foot center, to the nearest 1/8 inch.

(6) Machine Dimensions (F): Although not illustrated, there is another screen used to enter the distance between the fixture element 54' secured to the shaft 14 of the machine on the left to the axial center of the coupling 16. This dimension is used to calculate the offset at the coupling center to compare residual misalignment to a predefined tolerance.

(7) Tube/Tip Selection: This screen is a text menu screen displayed after the Machine Dimensions screens have been completed and accepted. Based on the data entered for dimension "c" the analyzer performs a calculation to provide the user with the following information:

(a) Tube—length of the tube required, along with the color of a tube identity tape; and (b) Tip—the tip required, either long or short.

Figure 18:
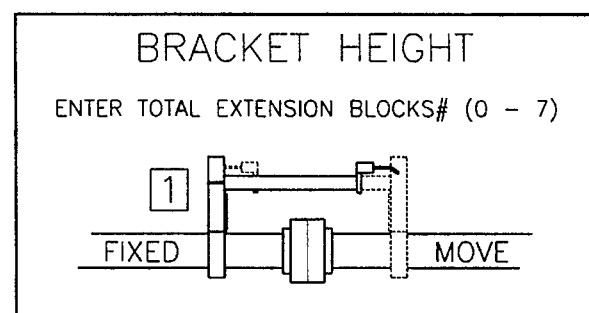
FIGS. 18 and 19 are graphical representations which may be presented on the display of the portable alignment analyzer for assisting the user in entering bracket height setup information.
Figure 19:
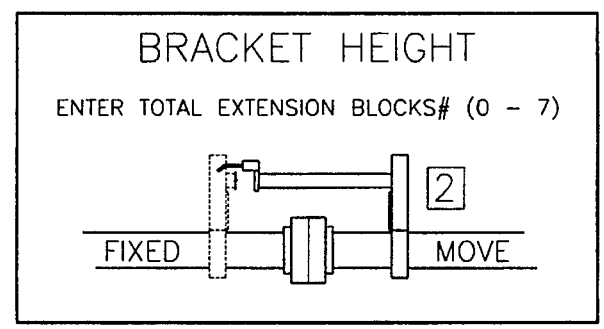

(8) Bracket Height: The screens depicted in FIGS. 18 and 19 are presented on the display device 120. FIG. 18 is used to enter the total length of the vertical spacing block(s) mounted on the left side machine. The range is 0–7. FIG. 19 is used to enter the total length of the block(s) mounted on the right side machine. The range also is 0–7.

Figure 20:
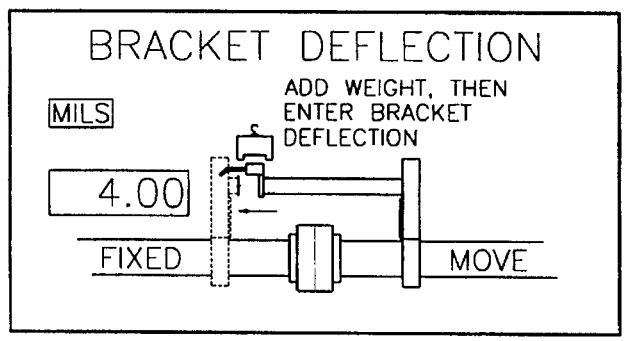
FIGS. 20 and 21 are graphical representations which may be presented on the display of the portable alignment analyzer for assisting the user in setting up bracket deflection setup information.
Figure 21:
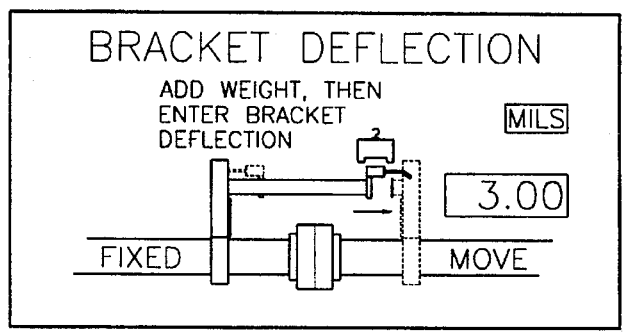

(9) Bracket Deflection: The screens depicted in FIGS. 20 and 21 are presented on the display device 120 after the Bracket Height screens have been completed and accepted. FIG. 20 is used to enter the reading taken from the indicator closest to the machine on the left. In the example of FIG. 20, the indicator was set to mils, and the reading on the indicator was 0.004 (inches). FIG. 21 is similarly used to enter values taken from the indicator closest to the machine on the right.

Figure 22:
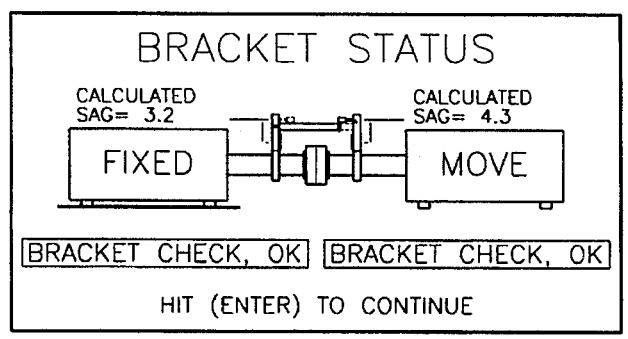
FIG. 22 is a graphical representation which may be presented on the display of the portable alignment analyzer for assisting the user in entering bracket status setup information.

(10) Bracket Status: After the Bracket Deflection screens have been completed and accepted, the screen of FIG. 22 is displayed. The FIG. 22 screen shows the calculated sag values that will be used by the analyzer 42 to calculate machine moves. If the analyzer 42 determines that the readings are out of range, an error message is displayed and the user is returned to previous screens to confirm the values that were entered.

The system also has the capability to store and retrieve notes pertaining to an alignment job, and general machine observations (i.e. soft foot location). Thus a user can enter notes into the analyzer 42, which notes are transferred to the database, and subsequently Loaded back into the analyzer as "previous" job notes when a new alignment job is being performed.

Acquiring Alignment Data

Figure 24:
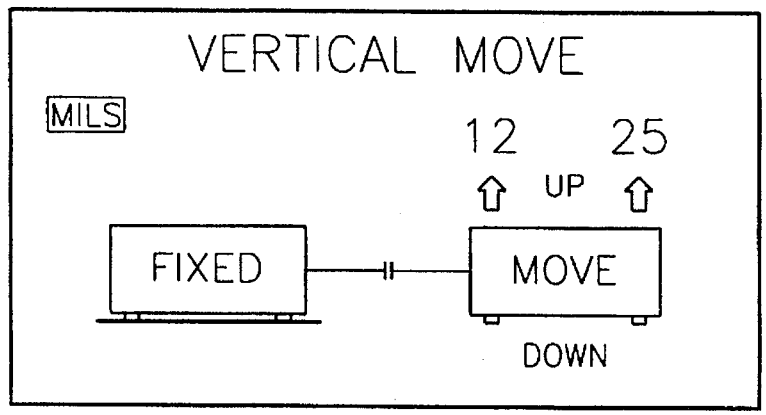
FIG. 24 is a graphical representation which may be presented on the display of the portable alignment analyzer for indicating to the user vertical machine moves, as calculated by the portable alignment analyzer, which will tend to bring the shafts of a machine set into alignment.
Figure 25:
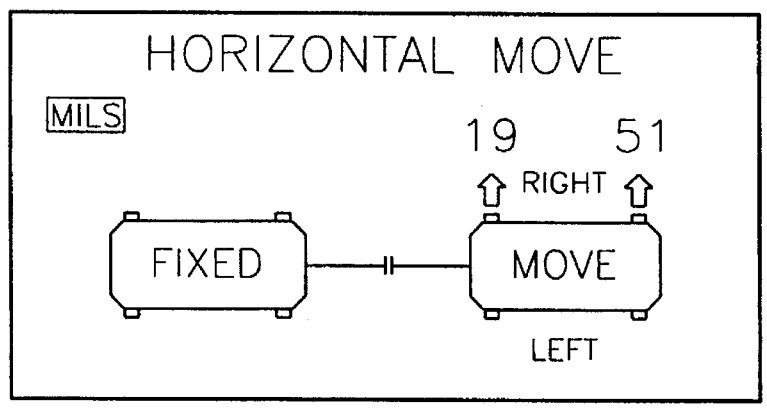
FIG. 25 similarly is a graphical representation which may be presented on the display of the portable alignment analyzer for indicating to the user horizontal machine moves as calculated by the portable alignment analyzer which will tend to bring the shafts of the machine set into alignment.

With the job defined, including all setup information, the next step is to take the actual offset readings. This is done with the aid of graphical menu screens as are depicted in FIGS. 23, 24 and 25, and typically is repeated a number of times following a series of adjustments of the movable machine.

Figure 23:
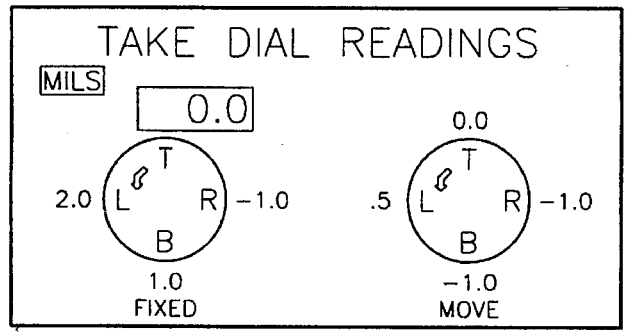
FIG. 23 is a graphical representation which may be presented on the display of the portable alignment analyzer for assisting the user in entering offset readings taken during the course of an alignment procedure.

FIG. 23 shows a "Take Dial Readings" screen which represents locations where indicator readings are recorded, and the direction in which coupled shafts are rotated. T stands for top. B stands for bottom. L and R stand for left side and right side of coupling respectively, as viewed from the stickman of FIG. 10. An arrow within each circle shows how the coupling should be rotated, as set up by the Job Definition. In this example, readings from the indicator closest to the fixed machine are entered around the circle labeled "fixed". Readings from the indicator closest to the movable machine are entered around the circle labeled "move".

The fixed-top location is the starting point. The next location the cursor jumps to is determined by the job setup. The order in which the complete set of alignment readings are entered is dependent upon the machine locations, dial orientation and rotation of the shafts during the alignment job. The Up Arrow and Down Arrow keys are used to scroll around the reading locations. "Enter" accepts the complete screen at any time.

The readings at the top, bottom, right and left points should follow a simple rule known as the Data Validity Rule. This rule states that, for each set of readings, the sum of the top and bottom measurements will equal the sum of the right and left measurements. If the readings do not adhere to the Data Validity Rule, a message is displayed describing where the error is and how severe it is. (The strictness of validity rule enforcement can be set by the user.) If only three readings can be taken, the analyzer 42 will accept just three. The disadvantage in using only three readings is that the analyzer 42 cannot check for data validity errors.

Performing Machine Moves

From the offset data, the portable alignment analyzer 42 calculates machine moves tending to bring the shafts of the machine set into alignment. The results of these calculations are presented to the user as a series of screens on the display device 120, including the screens of FIGS. 24 and 25.

FIG. 24 shows a Vertical Move screen which represents a side view of the fixed and movable machines. It shows the amount of vertical movement (shimming) needed to bring the movable machine into alignment in that direction. Necessary movement is expressed in either mils-or millimeters. The up or down movement is represented by arrows at the appropriate location. Required movement is shown as a number at the head of each arrow.

FIG. 25 shows a screen which represents a top view of the fixed and movable machines. It displays the amount of horizontal movement needed to bring the movable machine into alignment in that direction. The right and left sides of the movable machine are shown as they would be seen from the stickman's view. The amount of movement needed is shown in either mils or millimeters. Arrows on the appropriate side of the movable machine indicate in which direction the movable machine must be moved. Again, required movement amount is shown as a number at the head of each arrow.

Alignment Tolerances

Figure 26:
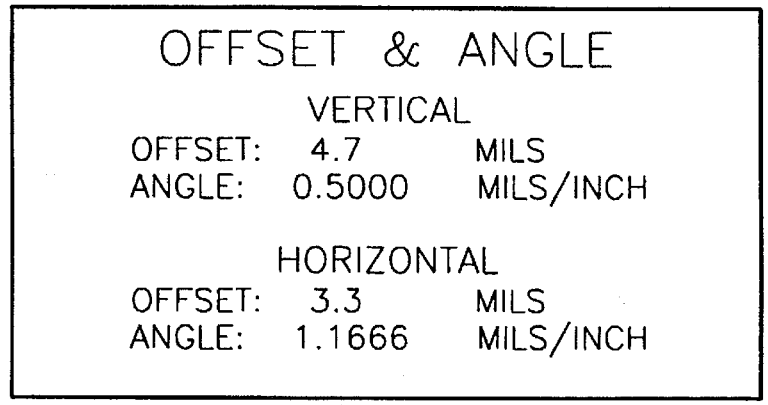
FIG. 26 is a graphical representation which may be presented on the display of the portable alignment analyzer for indicating the amount of offset and angular misalignment, based on the last set of alignment readings.

FIG. 26 shows an "Offset & Angle, Tolerances" text screen which shows the amount of offset and angular misalignment (based upon the last set of alignment readings). All shaft misalignment is a combination of offset and angular misalignment. This screen breaks down the misalignment into each component. The amount of each type of misalignment is shown for both the horizontal and vertical directions. The offset and angle information is intended to be used as an alignment tolerance only (to determine how close the alignment is based upon the last set of alignment readings); this data is not to be used to align the machines. For this reason, offset and angle are simply presented as positive numbers.

The combination of offset and angle is a direct indication of the alignment condition in the particular plane (horizontal or vertical). Optimum alignment occurs when offset and angle are zero. In most cases, that degree of accuracy is not reached. Thus, tolerances are used to set an achievable goal. Recommended tolerances (referenced to RPMs) are listed in the table below. (However, these tolerances are only recommended and can be modified in the database maintained in the base computer 102 for subsequent loading into the analyzer 42.)

| Speed (RPM) | Excellent | | Acceptable | |
|---|---|---|---|---|
| | Offset (mils) | Angle (mils/inch) | Offset (mils) | Angle (mils/inch) |
| <500 | 5.0 | 1.5 | 6.0 | 2.0 |
| 500–1250 | 4.0 | 1.0 | 5.0 | 1.5 |
| 1250–2000 | 3.0 | 0.5 | 4.0 | 1.0 |
| 2000–3500 | 2.0 | 0.3 | 3.0 | 0.5 |
| 3500–7000 | 1.0 | 0.25 | 2.0 | 0.3 |
| >7000 | .5 | 0.2 | 1.0 | 0.25 |

Once predetermined tolerance targets are reached, the machinery should operate correctly without any adverse effects from misalignment.

Preferably, the separate "offset" and "angle" misalignment components for each of the horizontal and vertical planes are combined to determine a single "amount" of misalignment for the particular plane, as is described in detail in the above-incorporated application Ser. No. 08/072,316, now U.S. Pat. No. 5,526,282. As there disclosed, the combined amount of misalignment can be graphically displayed for straightforward comparison with "acceptable" and "excellent" tolerance ranges.

After viewing machine moves in both directions, the user can store the reading set. A screen briefly displays how many reading sets have been stored. A maximum of twenty sets per alignment job can be stored.

Alignment Reports

Figure 27:
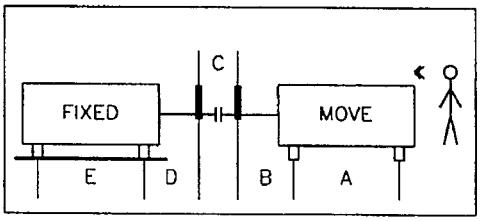
FIG. 27 is an example of a graphical alignment report which may be generated by the portable alignment analyzer and printed on a hard copy printer.

If the parallel printer 114 is connected to the portable alignment analyzer 42, a report of an alignment job can be printed. (In addition, hard copies of screen displays can be printed.) FIG. 27 shows a typical such printed alignment report, with encircled reference numbers identifying various fields as follows:

(1) Date and time the alignment job was saved. If the report is from the current job in the analyzer, the date and time that the report was printed is placed here.

(2) Job number and description is given as found in the Job Definition section.

(3) Orientation of stickman to the machine moves is shown. Location and values of the machine and indicator dimensions are given.

(4) Types of units used in this report are shown. Distance units are used for the machine indicator dimensions A, B, C, D, and E. Align Data units are used for the Readings, Machine Moves, Sag and Offset values. Angle units are used for the Angle values.

(5) Sag values for fixtures mounted on the movable and fixed machine shafts.

(6) Indicator measurements for the movable and fixed shafts in mils or mm. Each set of readings taken is listed. A "--" symbol means that value was calculated. Up to twenty sets can be displayed. If "Final" is chosen in the Print Report menus, only the last set of readings will be displayed.

(7) Machine moves calculated for each set of indicator readings that were taken. Any upward movement is positive; any movement to the stickman's left is positive.

(8) The machine moves calculated take into account the amount of thermal growth experienced by machine(s) during operation.

(9) The amount of offset and angular misalignment in both the vertical and horizontal directions is listed for each set of indicator readings taken. Since these are to be used as alignment tolerances only, all values are positive. This format is Text Only; the Offset & Angle graphs can also be printed. You can configure this in the Print Report menu.

(10) Any note that was entered for the job is shown.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A shaft alignment system comprising:

a base computer having a memory, a data port, and an input device, alignment documentation corresponding to at least one alignment job residing in a data base in the memory of the base computer, a portable alignment analyzer having memory, a data port, and an input device, a data link for communicating between the base computer data port and the analyzer data port, means for transferring the alignment documentation from the data base in the memory of the base computer, through the data port of the base computer, through the data link, through the data port of the analyzer, and into the memory of the analyzer, means for editing the alignment documentation transferred to the analyzer, while the alignment documentation is in the analyzer, and means for reconfiguring the analyzer in automated response to the alignment documentation stored in the analyzer's memory to produce a reconfigured analyzer.

2. The shaft alignment system of claim 1 wherein the analyzer further comprises:

the memory having a stored job area and a current job area, means for transferring the alignment documentation corresponding to one alignment job from the stored job area to the current job area of the memory of the analyzer, the means for reconfiguring the analyzer for further reconfiguring the analyzer in automated response to the alignment documentation in the current job area, means for acquiring a first set of alignment measurements from an alignment fixture having measurement means attached to first and second rotating shafts, means for calculating alignment adjustments based on the alignment measurements, the configuration of the analyzer, and the alignment documentation, and means for transferring the alignment documentation from the current job area to the stored job area.

3. The shaft alignment system of claim 2 wherein the reconfigured analyzer further comprises:

means for taking a second set of alignment measurements in response to an alignment method variable, and means for acquiring the second set of alignment measurements into the current job area of the memory of the analyzer as a part of the alignment documentation stored there.

4. The shaft alignment system of claim 2 wherein the reconfigured analyzer further comprises:

means for acquiring data from the measurement means via the analyzer data input device if a fixture configuration variable indicates that the measurement means has no other data communication option, means for acquiring data from the measurement means via a cable if the fixture configuration variable indicates that the measurement means communicates via a cable, and means for acquiring data from the measurement means via an infrared link if the fixture configuration variable indicates that the measurement means communicates via an infrared link.

5. The shaft alignment system of claim 2 wherein the reconfigured analyzer further comprises:

the means for calculating for further performing calculations based on a combination reverse dial alignment procedure if a fixture configuration variable indicates that a combination alignment fixture is to be used and an alignment method variable indicates that a reverse indicator method is to be used, the means for calculating for further performing calculations based on a general reverse dial procedure if the fixture configuration variable indicates that a general fixture is to be used and the alignment method variable indicates that a reverse indicator method is to be use, and the means for calculating for further performing calculations based on a face-and-rim alignment procedure regardless of the setting of the fixture configuration variable if the alignment method variable indicates that a face-and-rim alignment method is to be used.

6. The shaft alignment system of claim 2 wherein the reconfigured analyzer further comprises:

means for acquiring data from a combination alignment fixture if a fixture configuration variable indicates that a combination alignment fixture is to be used, and means for acquiring data from a general fixture if the fixture configuration variable indicates that a general fixture is to be used.

7. The shaft alignment system of claim 2 wherein said reconfigured analyzer further comprises means for acquiring a second and a third set of data from the fixture if an alignment method variable indicates that a three point method is to be used.

8. The shaft alignment system of claim 2 wherein the reconfigured analyzer further comprises:

the means for calculating for further operating on data taken in-phase if a fixture configuration variable indicates that the measurement means will take the data in-phase, and the means for calculating for further operating on data taken out-of-phase if the fixture configuration variable indicates that the measurement means will take the data out-of-phase.

9. The shaft alignment system of claim 1 further comprising:

an alignment fixture having an attachment means, and a measurement means for producing alignment measurements corresponding to offset and angularity between first and second rotating shafts which are coupled together with a coupling, means for acquiring the alignment measurements into the memory of the analyzer as a part of the alignment documentation, and means for calculating alignment adjustments based on the alignment measurements, the configuration of the analyzer, and the alignment documentation.

10. The shaft alignment system of claim 1 further comprising:

means for transferring the alignment documentation from the memory of the analyzer, through the data port of the analyzer, through the data link, through the data port of the base computer, and into the data base in the memory of the base computer.

11. The system of claim 1 wherein the alignment documentation further comprises sag variables indicating the deflection and height of mounting means which mount the measurement means to the fixture.

12. The system of claim 1 wherein the alignment documentation further comprises a move variable indicating which one of the first and second shafts can be moved relative to the other, and which is immobile.

13. The system of claim 1 wherein the alignment documentation further comprises a rotation direction variable indicating the direction in which the shafts rotate.

14. The system of claim 1 wherein the alignment documentation further comprises an orientation variable indicating the vantage point from which other variables, such as the rotation direction variable, are referenced.

15. The system of claim 1 wherein the alignment documentation further comprises thermal growth variables indicating the horizontal and vertical shift experienced by the first and second shafts as they heat up during rotation.

16. The system of claim 1 wherein the alignment documentation further comprises an alignment method variable indicating which set of a plurality of alignment equations are to be used during the alignment calculations.

17. The system of claim 1 wherein the alignment documentation further comprises a fixture configuration variable indicating which type of fixture is to be used during the alignment procedure.

18. The system of claim 1 wherein the alignment documentation further comprises fixture size variables indicating the size of the fixture to be used during the alignment procedure.

19. The system of claim 1 wherein the alignment documentation further comprises machine dimension variables indicating locations of points of adjustment, and locations of reference points on the first and second shafts.

20. The system of claim 1 wherein the alignment documentation further comprises a speed variable indicating the speed at which the first and second shafts rotate.

21. The system of claim 1 wherein the alignment documentation further comprises notes variables containing comments input by a technician.

22. The system of claim 1 wherein the alignment documentation further comprises tolerances variables indicating maximum allowable differences in horizontal and vertical offset and angularity between the first and second shafts.

23. The system of claim 1 wherein the alignment documentation further comprises efficiency variables which can be used by the analyzer to calculate the effect which the alignment procedure has had on the efficiency of the rotating shafts.

24. The system of claim 1 wherein the alignment documentation further comprises dial orientation variables indicating the position of the measurement means.

25. The system of claim 1 wherein the alignment documentation further comprises a machine description variable indicating the type of equipment in which the rotating shafts operate.

26. The system of claim 1 wherein the alignment documentation further comprises a station variable indicating the location of the equipment in which the rotating shafts operate.

27. A shaft alignment system comprising:

a base computer having a memory, a data port, and an input device, alignment documentation corresponding to a plurality of alignment jobs residing in a data base in the memory of the base computer, said alignment documentation further comprising:

a rotation direction variable indicating the direction in which the shafts rotate;

an alignment method variable indicating which set of a plurality of alignment equations are to be used during the alignment calculations;

a fixture configuration variable indicating which type of fixture is to be used during the alignment procedure;

machine dimension variables indicating locations of points of adjustment and locations of reference points on the first and second shafts;

tolerances variables indicating maximum allowable differences in horizontal and vertical offset and angularity between the first and second shafts; and a machine description variable indicating the type of equipment in which the rotating shafts operate;

a portable alignment analyzer having memory, a data port, and an input device, the memory further comprising a stored job area and a current job area, a data link for communicating between the base computer data port and the analyzer data port, means for transferring the alignment documentation from the data base in the memory of the base computer, through the data port of the base computer, through the data link, through the data port of the analyzer, and into the stored job area of the memory of the analyzer, means for transferring a portion the alignment documentation corresponding to one alignment job from the stored job area to current job area of the memory of the analyzer, means for performing alignment calculations, and means for reconfiguring the operation of analyzer in automated response to the alignment documentation stored in the current job area of the memory of the analyzer so that the alignment calculations automatically correspond to the direction in which the shafts rotate, the set of alignment equations which are to be used during the alignment calculations, the type of fixture which is to be used during the alignment procedure, the locations of points of adjustment, the locations of reference points on the first and second shafts, and the type of equipment in which the rotating shafts operate.

28. A shaft alignment method comprising:

providing a base computer having a memory, a data port, and an input device, entering alignment documentation corresponding to at least one alignment job into a data base residing in the memory of the base computer using the input device, providing a portable alignment analyzer having memory, a data port, and an input device, the memory further comprising a stored job area and a current job area, communicating between the base computer data port and the analyzer data port using a data link, transferring the alignment documentation from the data base in the memory of the base computer, through the data port of the base computer, through the data link, through the data port of the analyzer, and into the stored job area of the memory of the analyzer, transferring the alignment documentation corresponding to one alignment job from the stored job area to the current job area of the memory of the analyzer, editing the alignment documentation in the current job area of the analyzer, reconfiguring the operation of the analyzer in automated response to the alignment documentation in the current job area, providing an alignment fixture having an attachment means, and a measurement means for producing measurements corresponding to offset and angularity between first and second rotating shafts which are coupled together with a coupling, connecting the fixture to the first and second shafts using the attachment means, rotating the first and second shafts, taking alignment measurements on the first and second shafts, corresponding to at least three different rotational orientations, using the measurement means, acquiring the alignment measurements into the current job area of the memory of the analyzer, supplementing the alignment documentation stored in the current job area with the alignment measurements, calculating alignment adjustments using the analyzer, based on the alignment measurements, the configuration of the analyzer, and the alignment documentation, moving one of the first and second shafts relative to the other based on the calculated alignment adjustments, transferring the alignment documentation, which has been edited and supplemented, from the current job area to the stored job area, transferring the alignment documentation from the stored job area of the memory of the analyzer, through the data port of the analyzer, through the data link, through the data port of the base computer, and into the data base in the memory of the base computer.

29. The method of claim 28 further comprising:

the steps of transferring the alignment documentation further comprising;

transferring an alignment method variable indicating which set of a plurality of alignment equations are to be used during the alignment calculations, and the step of reconfiguring the operation of the analyzer further comprising reconfiguring the analyzer in automated response to the alignment method variable to perform the additional steps of;

taking a second set of alignment measurements on the first and second shafts after moving one of the first and second shafts relative to the other, to confirm the affectivity of the alignment process, and acquiring the second set of alignment measurements into the current job area of the memory of the analyzer as a part of the alignment documentation stored there, before transferring the alignment documentation from the current job area to the stored job area.

30. The method of claim 28 further comprising:

the steps of transferring the alignment documentation further comprising;
transferring a fixture configuration variable indicating which type of fixture is to be used during the alignment procedure, and the step of reconfiguring the operation of the analyzer further comprising reconfiguring the analyzer in automated response to the fixture configuration variable by;
configuring to acquire data via the analyzer data input device if the fixture configuration variable indicates that the measurement means has no other data communication option,
configuring to acquire data via a cable if the fixture configuration variable indicates that the measurement means communicates via a cable, and
configuring to acquire data via an infrared link if the fixture configuration variable indicates that the measurement means communicates via an infrared link.

31. The method of claim 28 further comprising: he steps of transferring the alignment documentation further comprising;
transferring an alignment method variable indicating which set of a plurality of alignment equations are to be used during the alignment calculations, and
transferring a fixture configuration variable indicating which type of fixture is to be used during the alignment procedure, and the step of reconfiguring the operation of the analyzer further comprising reconfiguring the analyzer in automated response to a combination of the fixture configuration variable and the alignment method variable by;
configuring for a combination reverse dial alignment procedure if the fixture configuration variable indicates that a combination alignment fixture is to be used and the alignment method variable indicates that a reverse indicator method is to be used,
configuring for a general reverse dial procedure if the fixture configuration variable indicates that a general fixture is to be used and the alignment method variable indicates that a reverse indicator method is to be use, and configuring for a face-and-rim alignment procedure regardless of the setting of the fixture configuration variable if the alignment method variable indicates that a face-and-rim alignment method is to be used.

32. The method of claim 28 further comprising: the steps of transferring the alignment documentation further comprising;
transferring a fixture configuration variable indicating which type of fixture is to be used during the alignment procedure, and the step of reconfiguring the operation of the analyzer further comprising reconfiguring the analyzer in automated response to the fixture configuration variable by;
configuring to acquire data from a combination alignment fixture if the fixture configuration variable indicates that a combination alignment fixture is to be used, and
configuring to acquire data from a general fixture if the fixture configuration variable indicates that a general fixture is to be used.

33. The method of claim 28 further comprising:

the steps of transferring the alignment documentation further comprising;
transferring an alignment method variable indicating which set of a plurality of alignment equations are to be used during the alignment calculations, and the step of reconfiguring the operation of the analyzer further comprising reconfiguring the analyzer in automated response to the alignment method variable by;
configuring to acquire three sets of data from the fixture if the alignment method variable indicates that a three point method is to be used, and
configuring to acquire four sets of data from the fixture if the alignment method variable indicates that a four point method is to be used.

34. The method of claim 28 further comprising:

the steps of transferring the alignment documentation further comprising;
transferring a fixture configuration variable indicating which type of fixture is to be used during the alignment procedure, and the step of reconfiguring the operation of the analyzer further comprising reconfiguring the analyzer in automated response to the fixture configuration variable by;
configuring to calculate alignment adjustments using data taken in-phase if the fixture configuration variable indicates that the measurement means will take the data in-phase, and
configuring to calculate alignment adjustments using data taken out-of-phase if the fixture configuration variable indicates that the measurement means will take the data out-of-phase.

* * * * *